US012712793B2

(12) United States Patent
Buratti et al.

(10) Patent No.: US 12,712,793 B2
(45) Date of Patent: Aug. 18, 2026

(54) APPLICATION HEALTH MONITORING UTILIZING DISTRIBUTED VANTAGE POINTS

(71) Applicant: Cisco Technology, Inc., San Jose, CA (US)

(72) Inventors: Rinaldo Buratti, San Francisco, CA (US); Arash Molavi Kakhki, San Francisco, CA (US); Xiao Zhang, Durham, NC (US); Javier Cruz Mota, Lussy-sur-Morges (CH); Federico Lovison, Fontanelle (IT)

(73) Assignee: Cisco Technology, Inc., San Jose, CA (US)

( * ) Notice: Subject to any disclaimer, the term of this patent is extended or adjusted under 35 U.S.C. 154(b) by 33 days.

(21) Appl. No.: 18/813,822

(22) Filed: Aug. 23, 2024

(65) Prior Publication Data

US 2026/0058890 A1 Feb. 26, 2026

(51) Int. Cl.

| | |
|---|---|
| ***H04L 43/04*** | (2022.01) |
| ***G06F 11/30*** | (2006.01) |
| ***G06F 11/34*** | (2006.01) |
| ***H04L 41/0631*** | (2022.01) |
| ***H04L 41/142*** | (2022.01) |

(52) U.S. Cl.

CPC ............ *H04L 43/04* (2013.01); *G06F 11/302* (2013.01); *G06F 11/3409* (2013.01); *H04L 41/0631* (2013.01); *H04L 41/142* (2013.01)

(58) Field of Classification Search

CPC ... H04L 43/04; H04L 41/0631; H04L 41/142; G06F 11/302; G06F 11/3409

See application file for complete search history.

(56) References Cited

U.S. PATENT DOCUMENTS

| | | | | |
|---|---|---|---|---|
| 2009/0122697 | A1 | 5/2009 | Madhyasha et al. | |
| 2015/0052441 | A1 | 2/2015 | Degioanni | |
| 2018/0248767 | A1 | 8/2018 | Degioanni | |
| 2023/0036050 | A1 * | 2/2023 | Kakhki | H04L 41/046 |
| 2023/0049207 | A1 * | 2/2023 | Oliveira | H04L 41/12 |
| 2024/0039837 | A1 | 2/2024 | Garcarz et al. | |

OTHER PUBLICATIONS

ThousandEyes: "ThousandEyes Solution Primer", Version 2b, Nov. 2020, Retrieved from https://www.cisco.com/c/dam/m/en_in/pdf/cisco-branded-solution-primer.pdf, pp. 1-15.

* cited by examiner

*Primary Examiner* — Philip C Lee

(74) *Attorney, Agent, or Firm* — Merchant & Gould P.C.; Kenneth J. Heywood

(57) ABSTRACT

In one implementation, a device may obtain performance metrics from vantage points distributed across a computing network. The device may map the performance metrics to a corresponding application based on a network address associated with the performance metrics. The device may establish a performance metric baseline for the corresponding application based on the performance metrics that are mapped to the corresponding application. The device may identify an anomaly in a performance metric mapped to the corresponding application based on a comparison to the performance metric baseline.

20 Claims, 9 Drawing Sheets

400

```
{ 'Google' :  {
        'fallback' :  ['google.com'],
        'subApps' :  {
            'Gmail' :  ['mail.google.com']
        }
    }
}
```

FIG. 4

905 START

910 OBTAIN PERFORMANCE METRICS FROM DISTRIBUTED VANTAGE POINTS

915 MAP THE PERFORMANCE METRICS TO APPLICATION

920 ESTABLISH A PERFORMANCE METRIC BASELINE

925 IDENTIFY ANOMALY

930 END

APPLICATION HEALTH MONITORING UTILIZING DISTRIBUTED VANTAGE POINTS

TECHNICAL FIELD

The present disclosure relates generally to computer networks and more particularly to application health monitoring utilizing distributed vantage points.

BACKGROUND

In the dynamic landscape of the Internet, cloud-based applications play a pivotal role in facilitating various aspects of enterprise operations, communication, and collaboration. Applications contribute significantly to the efficiency and effectiveness of modern enterprises and offer unparalleled opportunities to expand their reach, optimize operations, and deliver seamless services to customers worldwide. Similarly, for users, Internet applications provide convenience, accessibility, and connectivity across various devices, enabling them to access information, communicate, and engage with services effortlessly. Monitoring the health of Internet applications is important for enterprises to detect and address issues promptly, minimize downtime, and maintain user satisfaction.

BRIEF DESCRIPTION OF THE DRAWINGS

The implementations herein may be better understood by referring to the following description in conjunction with the accompanying drawings in which like reference numerals indicate identically or functionally similar elements, of which:

FIG. 4 illustrates an example of an application mapping catalog for application health monitoring utilizing distributed vantage points;

DESCRIPTION OF EXAMPLE IMPLEMENTATIONS

Overview

According to one or more implementations of the disclosure, a device may obtain performance metrics from vantage points distributed across a computing network. The device may map the performance metrics to a corresponding application based on a network address associated with the performance metrics. The device may establish a performance metric baseline for the corresponding application based on the performance metrics that are mapped to the corresponding application. The device may identify an anomaly in a performance metric mapped to the corresponding application based on a comparison to the performance metric baseline.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
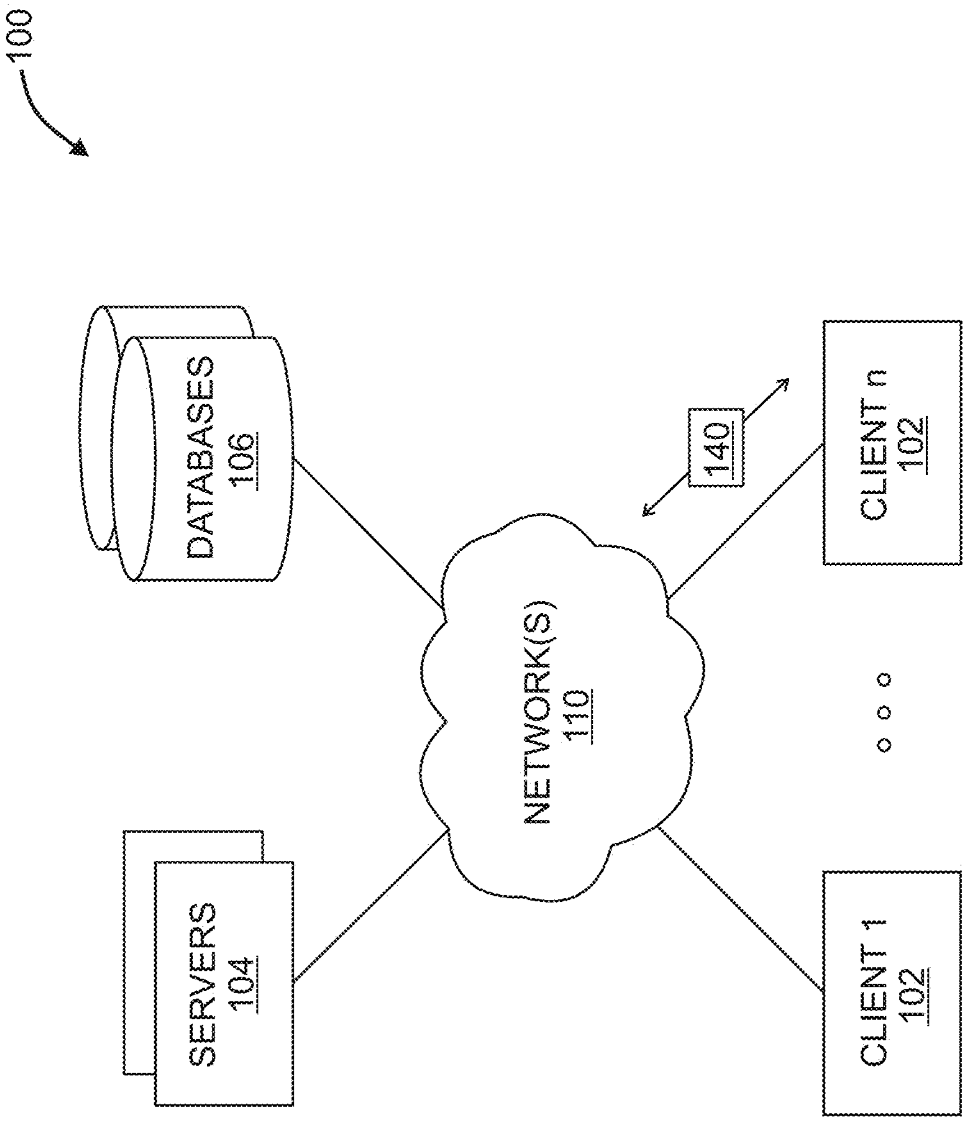
FIG. 1 illustrates an example computer network.

FIG. 1 is a schematic block diagram of an example simplified computing system (e.g., the computing system 100), which includes client devices 102 (e.g., a first through nth client device), one or more servers 104, and databases 106 (e.g., one or more databases), where the devices may be in communication with one another via any number of networks (e.g., network(s) 110). The network(s) 110 may include, as would be appreciated, any number of specialized networking devices such as routers, switches, access points, etc., interconnected via wired and/or wireless connections. For example, client devices 102, the one or more servers 104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, the one or more servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
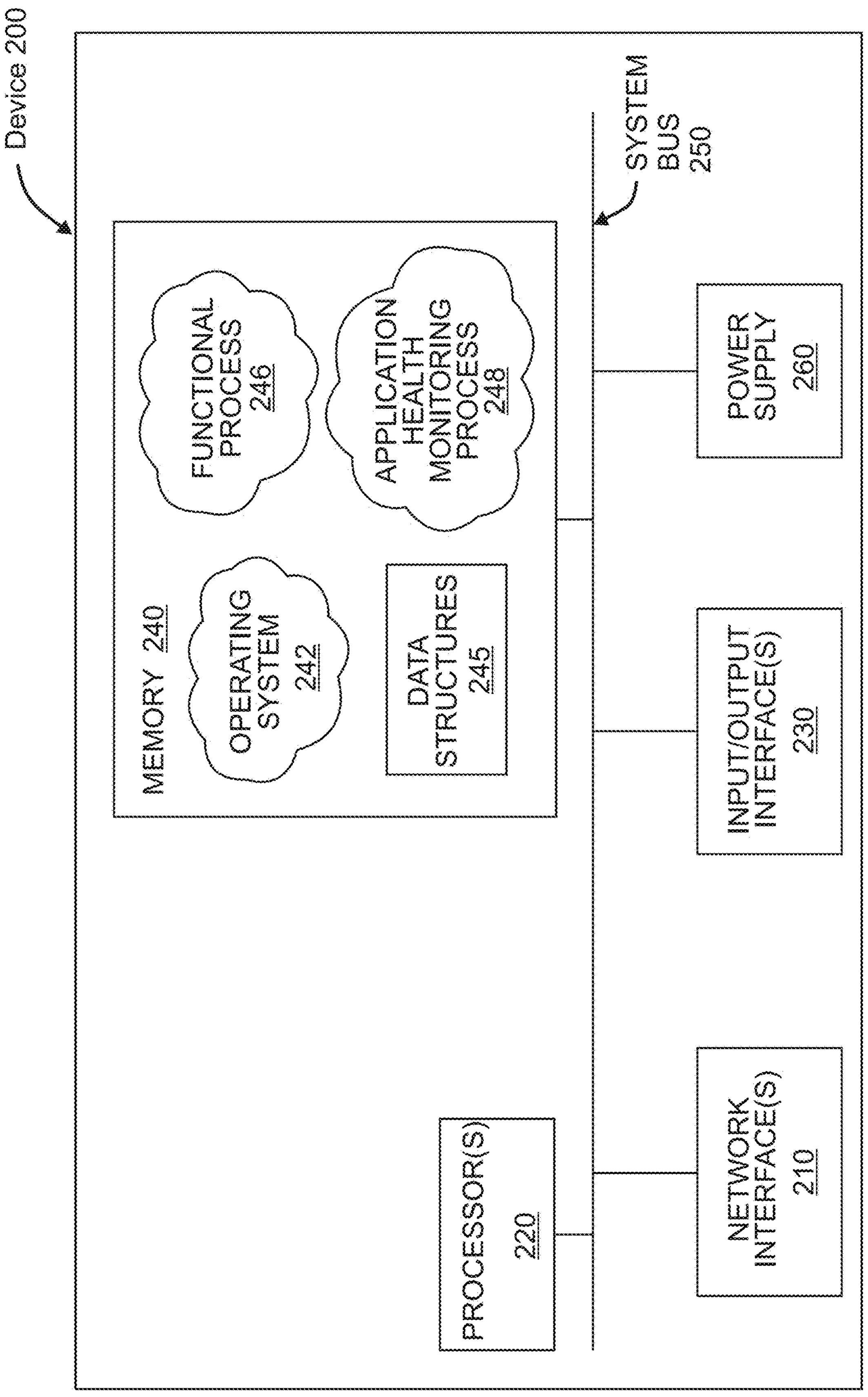
FIG. 2 illustrates an example computing device/node.

FIG. 2 is a schematic block diagram of an example node/device 200 (e.g., an apparatus) that may be used with one or more implementations described herein, e.g., as any of the devices shown in FIG. 1 above. Device 200 may comprise one or more network interfaces, such as interfaces 210 (e.g., wired, wireless, network interfaces, etc.), at least one processor (e.g., processor 220), and a memory 240 interconnected by a system bus 250, as well as a power supply 260 (e.g., battery, plug-in, etc.).

The interfaces 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes (e.g., functional processes 246), and on certain devices, an illustrative process such as an application health monitoring process 248, as described herein. Notably, functional processes 246, when executed by processor 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

In various implementations, as detailed further below, application health monitoring process 248 may include computer executable instructions that, when executed by processor 220, cause device 200 to perform the techniques described herein. To do so, in some implementations, application health monitoring process 248 may utilize and/or be a component of machine learning implementations. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, and c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, application health monitoring process 248 may employ and/or be utilized to handle prompts to and/or access of one or more supervised, unsupervised, or semi-supervised machine learning models. Generally, supervised learning entails the use of a training set of data that is used to train the model to apply labels to the input data. For example, the training data may include sample configurations labeled with textual metadata. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that the application health monitoring process 248 can employ and/or be utilized in concert with may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, application health monitoring process 248 may also include, or otherwise use or be employed to operate with, one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of configuring an observability platform to perform certain application analytics, application health monitoring process 248 may be a component of, use, and/or be utilized in the management of prompts/access to a generative model to perform distributed application health and performance monitoring from different vantage points, evaluating application health, characterizing application health, perform application mapping, performing performance or health baselining, generate configurations, perform analyses, perform root cause analysis, or other outputs based on a conversational input from a user (e.g., voice, text, etc.). Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
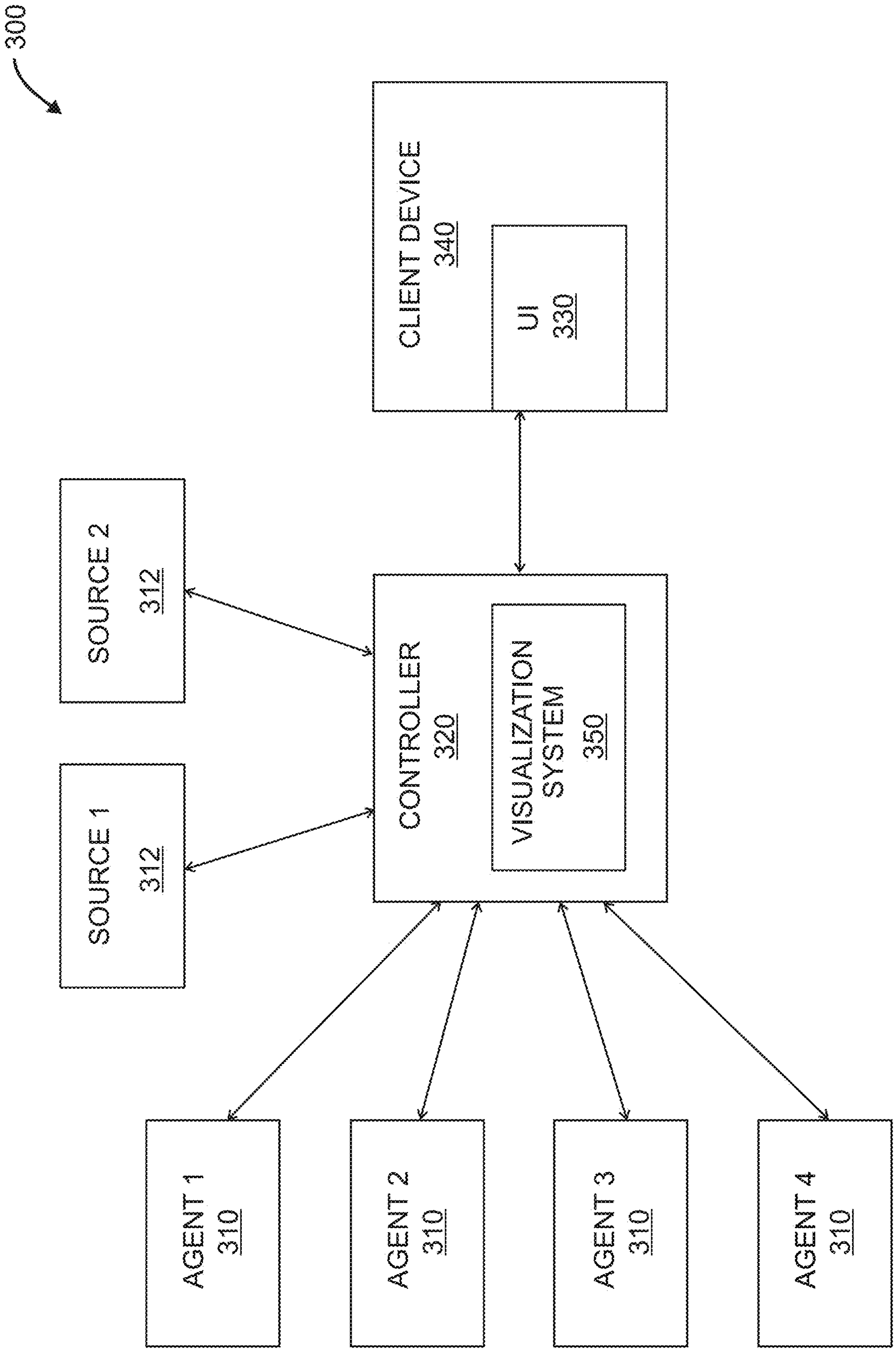
FIG. 3 illustrates an example observability intelligence platform.

FIG. 3 is a block diagram of an example of an observability intelligence platform 300 that can implement one or more aspects of the techniques herein. The observability intelligence platform 300 is a system that monitors and collects metrics of performance data for a network and/or application environment being monitored. At the simplest structure, the observability intelligence platform 300 includes one or more agents (e.g., agents 310), one or more sources (e.g., sources 312), and one or more servers/controllers (e.g., controller 320). Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform 300. The controller 320 may serve a user interface 330 (denoted UI in FIG. 3), such as a browser-based UI, that is the primary interface for monitoring, analyzing, and troubleshooting the monitored environment. Specifically, the controller 320 can receive data from agents 310, sources 312 (and/or other coordinator devices), associate portions of data (e.g., topology, transaction end-to-end paths and/or metrics, etc.), communicate with agents to configure collection of the data (e.g., the instrumentation/tests to execute), and provide performance data and reporting through user interface 330. User interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, a controller 320 may be installed locally and self-administered.

The controllers 320 receive data from the agents 310 (e.g., Agents 1-4) and/or sources 312 deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application. Further, the controllers 320 can receive data from sources 312 (e.g., sources 1-2). Any of the sources can be implemented to provide various types of observability data that can include information, metrics, telemetry data, business data, network data, etc.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be implemented as small files using web-based technologies, such as JavaScript agents injected into each instrumented web page (e.g., as close to the top as possible) as the web page is served and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain implementations, in the application intelligence model, a transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

An application transaction, in particular, is a representation of the particular service provided by the monitored environment that provides a view on performance data in the context of the various tiers that participate in processing a particular request. That is, an application transaction, which may be identified by a unique application transaction identification (ID), represents the end-to-end processing path used to fulfill a service request in the monitored environment (e.g., adding items to a shopping cart, storing information in a database, purchasing an item online, etc.). Thus, an application transaction is a type of user-initiated action in the monitored environment defined by an entry point and a processing path across application servers, databases, and potentially many other infrastructure components. Each instance of an application transaction is an execution of that transaction in response to a particular user request (e.g., a socket call, illustratively associated with the TCP layer). An application transaction can be created by detecting incoming requests at an entry point and tracking the activity associated with request at the originating tier and across distributed components in the application environment (e.g., associating the application transaction with a 4-tuple of a source IP address, source port, destination IP address, and destination port). A flow map can be generated for an application transaction that shows the touch points for the application transaction in the application environment. In one implementation, a specific tag may be added to packets by application specific agents for identifying application transactions (e.g., a custom header field attached to a hypertext transfer protocol (HTTP) payload by an application agent, or by a network agent when an application makes a remote socket call), such that packets can be examined by network agents to identify the application transaction identifier (ID) (e.g., a Globally Unique Identifier (GUID) or Universally Unique Identifier (UUID)). Performance monitoring can be oriented by application transaction to focus on the performance of the services in the application environment from the perspective of end users. Performance monitoring based on application transactions can provide information on whether a service is available (e.g., users can log in, check out, or view their data), response times for users, and the cause of problems when the problems occur.

In accordance with certain implementations, both self-learned baselines and configurable thresholds may be used to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or application transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be implemented across multiple devices, on different devices, utilizing additional devices, and so on, and the views shown herein are merely simplified examples that are not meant to be limiting to the scope of the present disclosure.

As noted above, monitoring the health of Internet applications is crucial for enterprises to detect and address issues promptly, minimize downtime, and maintain user satisfaction. Currently, application monitoring tools primarily focus on two approaches: sentiment analysis and application instrumentation. Sentiment analysis tools may rely on user feedback to identify issues, while application instrumentation tools require the deployment of monitoring code within an application stack to collect performance data. Other systems rely only on signals that show a failure in order to be able to detect malfunctioning in the applications, providing information only around complete failures.

As a result, the existing approached have significant drawbacks. Sentiment analysis is often reactive and depends on users reporting issues, leading to delayed detection and response. Instrumentation-based tools necessitate cooperation from an application being monitored, especially in third-party applications. Systems that rely solely on failure signals may overlook partial performance degradation, which can still negatively impact user experience and/or may be a bellwether of impending failure. For example, an application may still establish connections but suffer from slow response times or high latency, leading to a poor user experience without triggering complete failure alters. Ultimately, these limitations translate to increased downtime, loss of productivity, and diminished user satisfaction, underscoring the lack of a comprehensive and proactive approach to monitoring application health and performance.

Application Health Monitoring Utilizing Distributed Vantage Points

In contrast, the techniques described herein introduce techniques to monitor the health and the performance of applications, utilizing distributed vantage points across different geographical and network locations. These techniques may be leveraged to evaluate and characterize (e.g., score) the health and the performance of each application, identifying and localizing application server issues with precision.

These techniques can benefit both application owners and users. For example, these techniques may empower users to have a view of an application's health and performance for applications in a catalog. For instance, a user can look at an application's points-of-presence and have an overview of the health/performance of every application selecting any available source/destination pair. Further, these techniques can be leveraged as a decision-making tool, for example to choose between two competing applications.

Illustratively, the techniques described herein may be performed by hardware, software, and/or firmware, such as in accordance with application health monitoring process 248, which may include computer executable instructions executed by the processor 220 (or independent processor of interfaces 210) to perform functions relating to the techniques described herein.

Specifically, according to various implementations, a device may a device may obtain performance metrics from vantage points distributed across a computing network. The device may map the performance metrics to a corresponding application based on a network address associated with the performance metrics. The device may establish a performance metric baseline for the corresponding application based on the performance metrics that are mapped to the corresponding application. The device may identify an anomaly in a performance metric mapped to the corresponding application based on a comparison to the performance metric baseline.

Operationally, FIG. 4 illustrates an example of an application mapping catalog 400 for application health monitoring utilizing distributed vantage points, in accordance with one or more implementations described herein. Application mapping catalog 400 may be a component of an application health monitoring system. The application health monitoring system may be configured to monitor the health and the performance of applications, utilizing distributed vantage points across different geographical and network locations (e.g., using observability platform agents such as ThousandEyes agents). This application health monitoring system may be operable to evaluate and characterize (e.g., score) the health and/or the performance of each application, identifying and localizing application servers' issues with precision.

An initial step in the application health monitoring approach may include application mapping. The application mapping catalog 400 may be an example of a logical structure of such a mapping. For instance, the application mapping catalog 400 may be based on based on a landing uniform resource locator (URL), a destination IP address, and/or a curated list of application and their domain names and provide a mapping of data points, such as URLs and IP addressed to their corresponding applications and sub-applications.

The application mapping catalog 400 may provide a hierarchical mapping that associates each of these data points with the most specific application definition achievable with these techniques. The application mapping catalog 400 may be represented as a structured list as illustrated (e.g., a nested dictionary structure categorizing applications by their main domains, subdomains, etc.).

The application mapping catalog 400 may be generated by a URL-to-application mapping mechanism. The mechanism may proceed by identifying a root domain for an application and then identifying a subdomain (if identifiable) for the application, in an attempt to map a data point to the most specific domain able to be identified.

For example, a domain such as 'gmail.google.com' may be the domain extracted from a landing URL. Starting from the root domain 'google.com,' a search for a matching may be conducted. In such an example, the match may be found for the application 'Google' (e.g., 'fallback' in the application mapping catalog 400).

Thereafter, the mechanism may expand its search to include a matching subdomain, adding the subdomain to the root domain. Continuing the example from above, the candidate domain may become 'gmail.google.com.' A search for a matching for any of the sub-applications (e.g., 'subApps' in the application mapping catalog 400) of the already mapped application may be performed, if there are any. In this case, a match may be identified for the 'Gmail' application.

Destination IP addresses may be another source to map data points to an application. Knowing the IP ranges of a specific application, the IP addresses may be used to perform the mapping.

Figure 5:
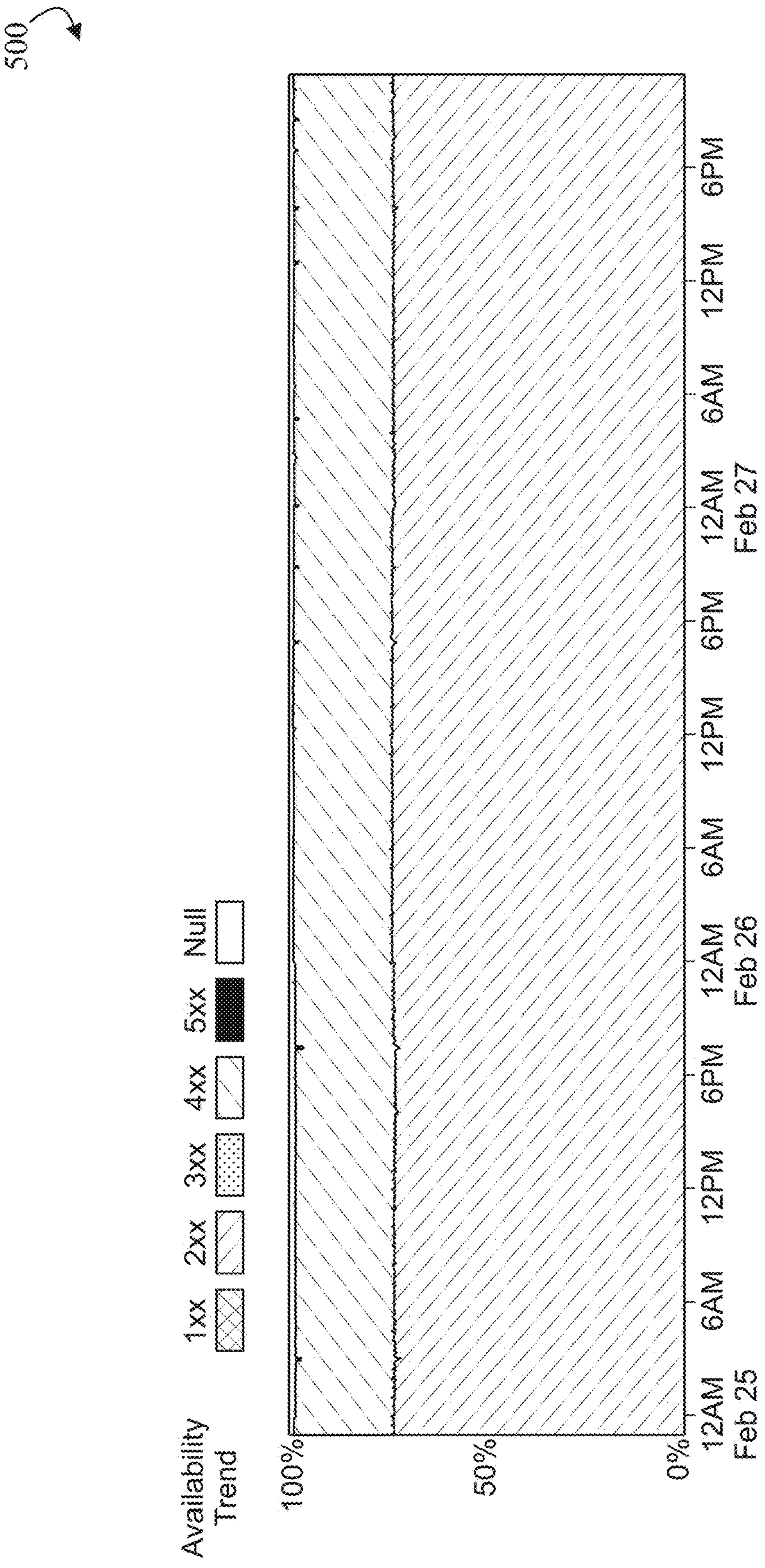
FIG. 5 illustrates an example of an availability trend graph involved in baselining metrics for application health monitoring utilizing distributed vantage points.

FIG. 5 illustrates an example of an availability trend graph 500 that may be involved in baselining metrics for application health monitoring utilizing distributed vantage points, in accordance with one or more implementations described herein. Baselining may play a central role in an application health monitoring system by establishing reference points for moral performance levels of applications. These baselines may be used to detect deviations and anomalies, ensuring the reliability and performance of the underlying applications.

Unlike approaches that collect network and HTTP data to baseline the availability and the performance in terms of latency and network metrics, such as packet loss jitter and end-to-end traces, various implementations of the application health monitoring system can provide a global visibility of the application infrastructure. For example, the application health monitoring system may be configured to perform a variety of baselining operations such as establishing normal performance metrics, performing anomaly detection, conducting proactive performance management, delivering granular performance analysis, generating geographical performance insights, performing baseline maintenance to support user experience, conducting root cause analysis, etc.

Baselining may include establishing performance benchmarks for the data points mapped to each application (e.g., as outlined with respect to FIG. 5). Building up baselines on these collected metrics may facilitate monitoring the health and/or performance of the corresponding applications. These baselines may be based on the information extracted from various vantage points (e.g., using observability platform agents such as ThousandEyes agents). In various implementations, the baselines may be generated using any portion (including all) of the data points previously mapped to an application (e.g., as outlined with respect to FIG. 5).

A first example of a baselined metric which may be utilized in monitoring application health and performance may include availability. Availability may refer to the ability of an application to successfully establish and/or maintain connections in response to a user request. Availability may be a metric indicating whether an application is accessibly and/or operational at any given time.

For example, an availability trend of an application (e.g., as illustrated in availability trend graph 500) may be determined by monitoring the HTTP response code returned from all the attempted HTTP connections. This metric may reveal whether an application's servers are having problems establishing connections. For instance, a sudden increase of '5xx' or 'null' may indicate that an application is experiencing some issues.

Figure 6:
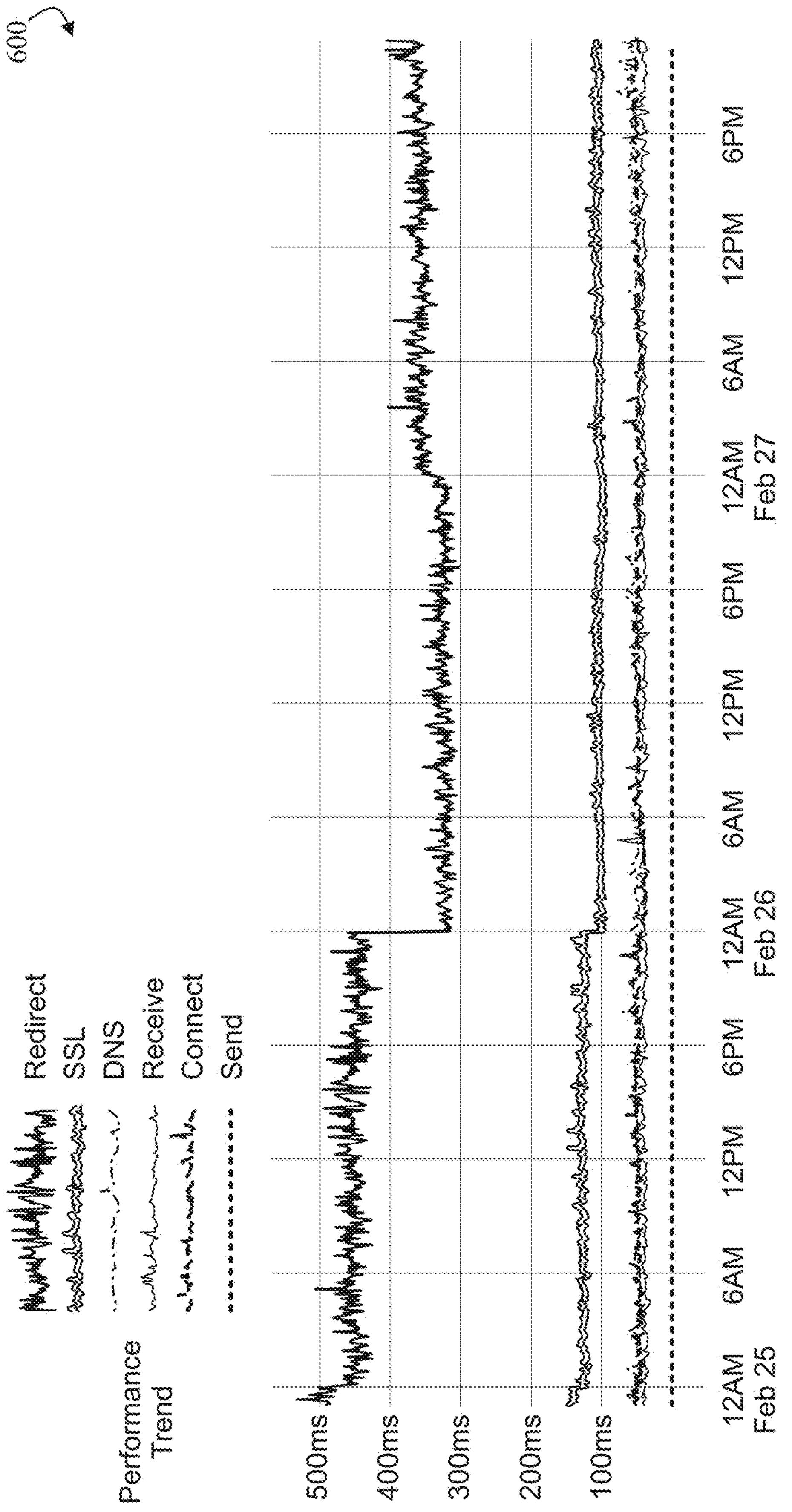
FIG. 6 illustrates an example of a performance trend graph involved in baselining metrics for application health monitoring utilizing distributed vantage points.

FIG. 6 illustrates an example of a performance trend graph 600 that may be involved in baselining metrics for application health monitoring utilizing distributed vantage points, in accordance with one or more implementations described herein. Performance may refer to various aspects how efficiently and effectively an application responds to user requests and/or processes data. Examples of performance metrics may include HTTP response timing metrics, pageload metrics, network performance metrics, or other metrics that are capable of contributing to a characterization of an application's performance.

The HTTP response timing metrics may be broken down in order to monitor the performance of the applications. For example, the HTTP response times may be broken down into redirect, DNS, connect, secure socket layer (SSL), send, and/or receive metrics. These metrics may be utilized to identify the precise type of the issue that is impacting an application. In addition, the timing metrics may be summed to keep track of the time-to-first byte, a metric that may be used as an indication of the responsiveness of a web server or other network resource.

Figure 7:
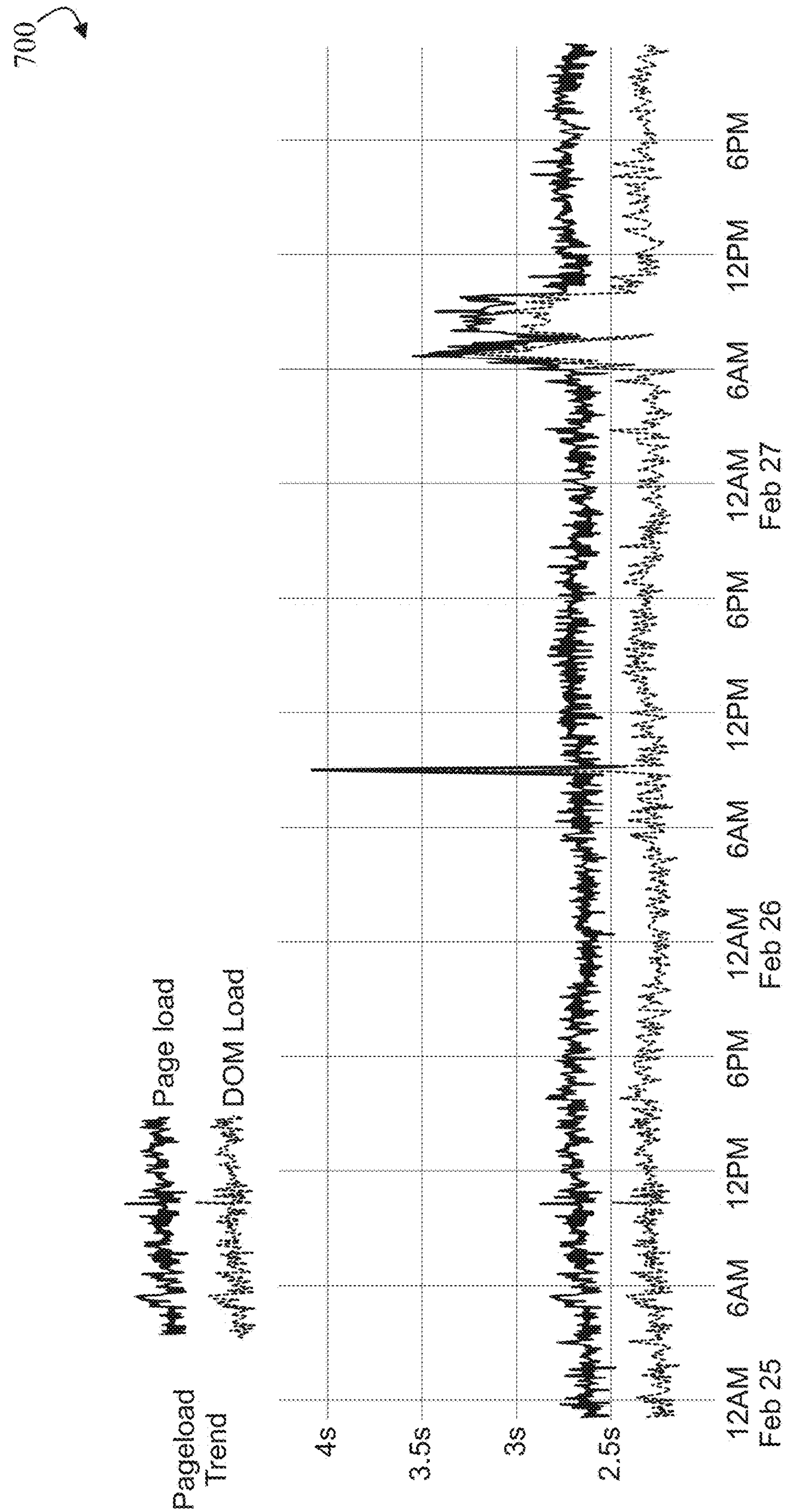
FIG. 7 illustrates an example of a pageload trend graph involved in baselining metrics for application health monitoring utilizing distributed vantage points.

FIG. 7 illustrates an example of a pageload trend graph 700 that may be involved in baselining metrics for application health monitoring utilizing distributed vantage points, in accordance with one or more implementations described herein. Similarly to the performance metric, the page load and the document object model (DOM) load may be baselined. Both of these metrics may provide an indication of the overall performance of an application respectively to load the page and to load the DOM. Even if the application is still able to establish connection, a spike in one of these two metrics could be an indication of performance degradation, i.e. loading the page can take several seconds (or minutes) resulting in a bad user experience.

Figure 8:
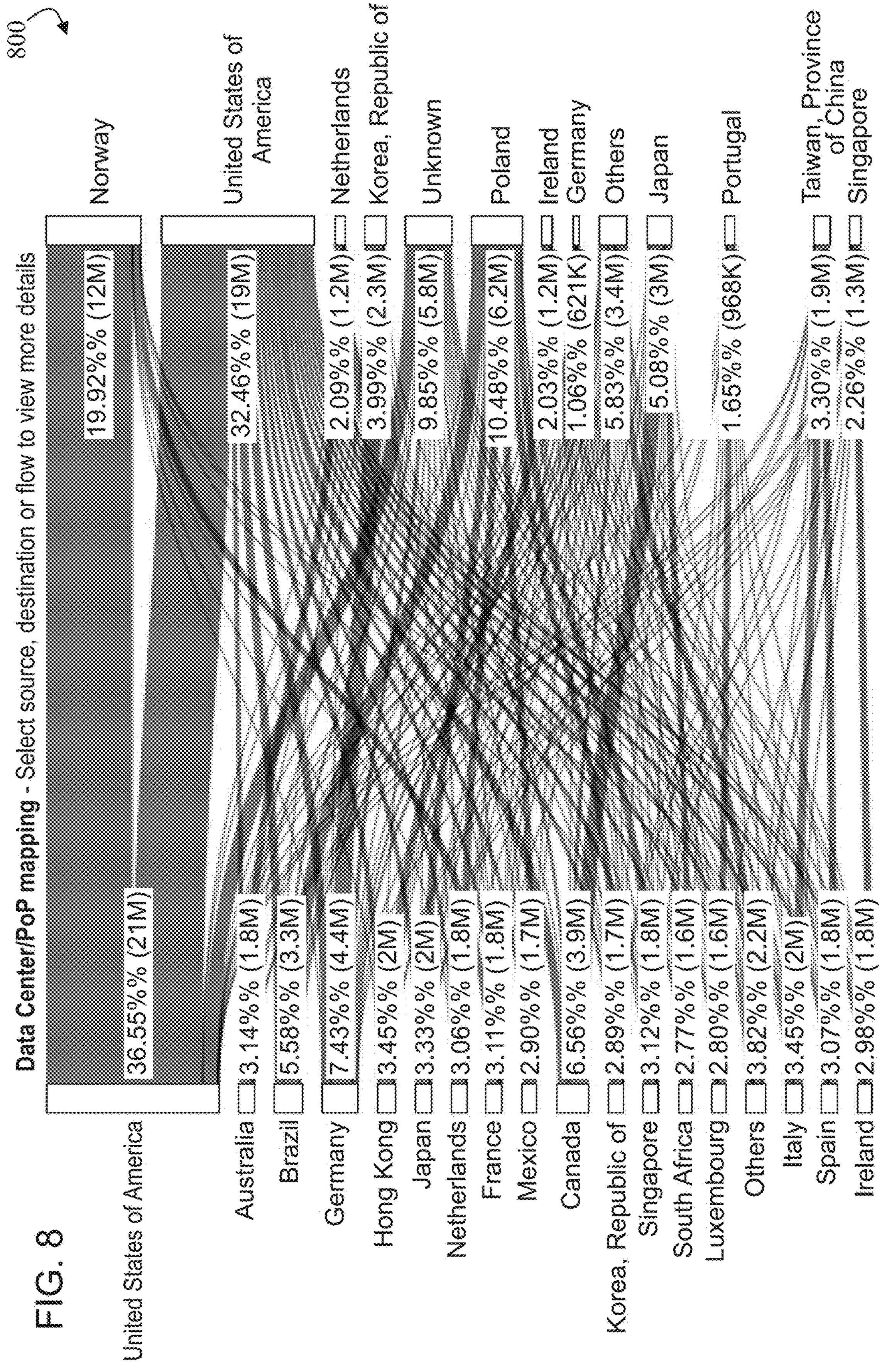
FIG. 8 illustrates an example of a point-of-presence mapping for application health monitoring utilizing distributed vantage points.

FIG. 8 illustrates an example of a point-of-presence (POP) mapping 800 for application health monitoring utilizing distributed vantage points, in accordance with one or more implementations described herein. As previously described, data points may be collected by agents (e.g., observability platform agents such as ThousandEyes agents) distributed across different geographical and network locations. These agents may perform tests and monitor metrics from their respective locations.

Application health monitoring system may be configured to map an agent's location to the application's PoPs, providing an overview of the geolocation distribution of applications infrastructure (e.g., at city level, subdivision level, country level, continent level, etc.). Moreover, the system may provide an overview of any metric for any given aggregation, for example to look at the performance of a specific source location and/or destination location. That is, the system may correlate the geographical and/or network locations of agents involved in collecting data points with the closest or most relevant PoPs of the application to characterize the performance and health of an application from different geographical perspectives and/or how well the PoPs are serving those regions.

In addition, such results may be synthesized from other sources in the measurement suite (e.g., ping, traceroute, border gateway protocol (BGP), etc.) to conduct complex root cause analysis, since anomalies in the application layer could be caused by network-layer (e.g., network queueing during traffic peak) or even BGP-layer (e.g., BGP drop) anomalies or even outages.

The application health monitoring system may leverage multiple metrics and signals to monitor the health of applications and can provide a very useful overview for both owners and application's customers to analyze complex applications issues. This system may empower users to have a view of applications health and performance for the applications in the catalog. They can look at an application's PoPs and have an overview of the health/performance of every application selecting any available source/destination pair.

As an integrated example of the various components of the application health monitoring system, consider an enterprise that utilized a web-based email service, such as Gmail, for its operations. Observability platform agents such as ThousandEyes agents may be deployed across various locations including New York, London, and Tokyo, to monitor the service. The system collects performance data such as HTTP response times and page load durations from these agents.

This data is mapped to the Gmail application using URL and IP-based mechanisms. Baselines are established for metrics like average response times and typical page load durations. If the agent in Tokyo detects a sudden increase in response time, deviating from the established baseline, the system flags this as an anomaly.

POP mapping reveals that the issue is localized to the Gmail POP in Asia, prompting the enterprise's IT team to investigate and resolve the issue, ensuring minimal disruption to users. This example illustrates how the system provides comprehensive real time monitoring and rapid issue detection.

Figure 9:
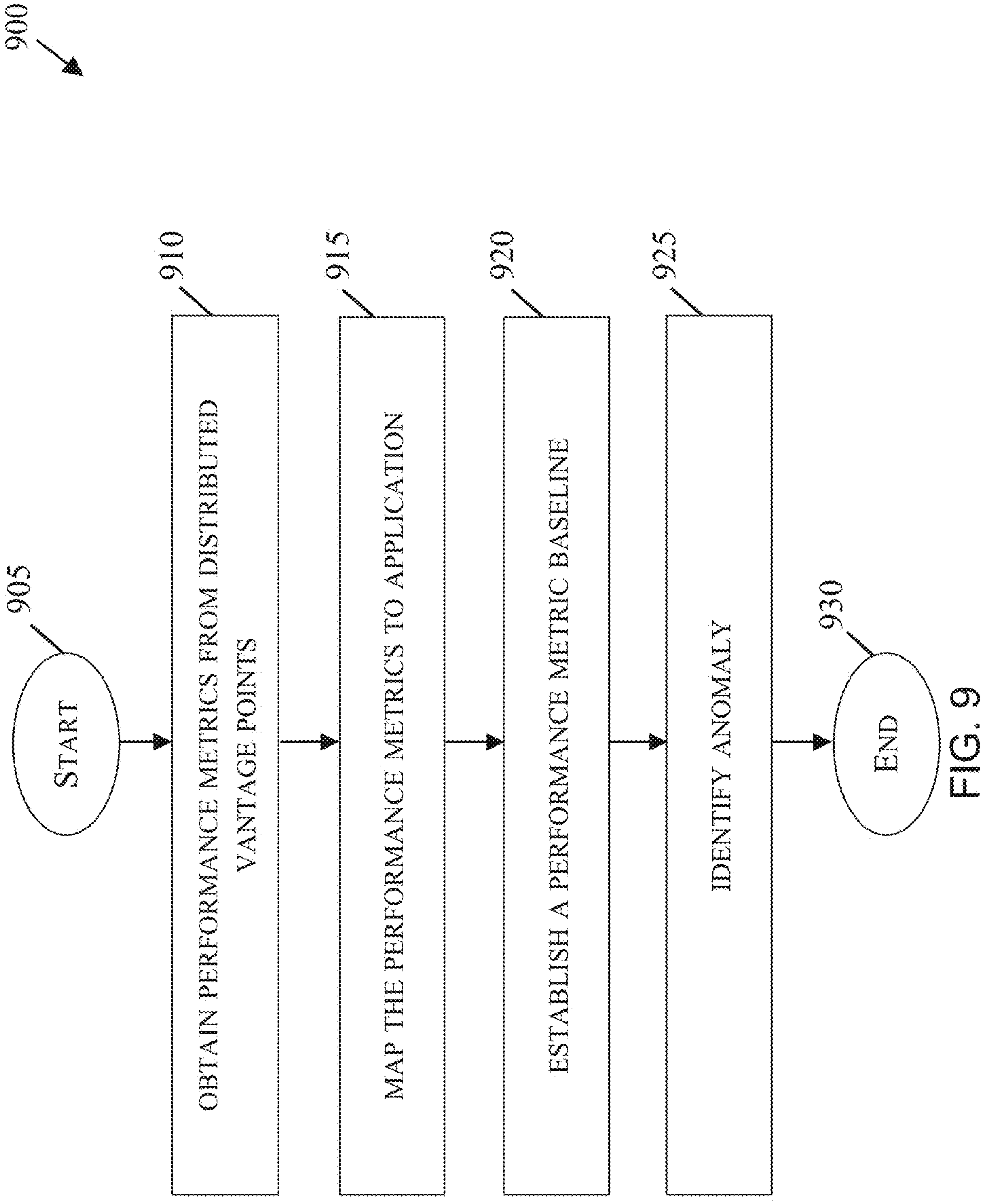
FIG. 9 illustrates an example of a simplified procedure for application health monitoring utilizing distributed vantage points, in accordance with one or more implementations described herein.

FIG. 9 illustrates an example of a simplified procedure for application health monitoring utilizing distributed vantage points, in accordance with one or more implementations described herein. For example, a non-generic, specifically configured device (e.g., device 200), may perform procedure 900 (e.g., a method) by executing stored instructions (e.g., application health monitoring process 248).

The procedure 900 may start at step 905, and continues to step 910, where, as described in greater detail above, the device (e.g., a controller, processor, etc.) may obtain performance metrics from vantage points distributed across a computing network. The performance metrics may include HTTP response codes returned to the vantage points from attempted HTTP connections. Additionally, the performance metrics may include page load and document object model load metrics.

In various implementations, the performance metrics may include HTTP response timing measurements. For instance, the performance metrics may include redirect, domain name system, connect, secure socket layer, send, receive, and/or time-to-first-byte metrics that are determined based on the HTTP response timing measurements.

At step 915, as detailed above, the device may map the performance metrics to a corresponding application based on a network address associated with the performance metrics. The performance metric may be mapped to the corresponding application using a landing uniform resource locator and/or a destination Internet protocol address extracted from the network address associated with the performance metrics.

In various implementations, mapping of the performance metric to the corresponding application may include identifying a matching application for a root domain extracted from the network address associated with the performance metrics and/or identifying a matching sub-application for a subdomain extracted from the network address associated with the performance metrics.

At step 920, the device may establish a performance metric baseline for the corresponding application based on the performance metrics that are mapped to the corresponding application. The performance metric baseline may be generated using all or some of the performance metrics previously mapped to the corresponding application.

At step 925, the device may identify an anomaly in a performance metric mapped to the corresponding application based on a comparison to the performance metric baseline. In various implementations, a mapping of each of the vantage points to corresponding points of presence of the corresponding application may be generated. Then, a characterization of performance metrics for a specific location may be generated generating based on the POP mapping.

In various implementations, procedure 900 may include performing a root cause analysis of the anomaly. The root cause analysis may be performed by correlating the performance metric with additional network data including ping, traceroute, and border gateway protocol data. The results of the root cause analysis may be provided to a user and/or anomaly detection and/or mitigation utility.

Procedure 900 may then end at step 935.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

The techniques described herein, therefore, introduce an application health monitoring system that integrates distributed vantage points, sophisticated application mapping, comprehensive baselining, and POP mapping to provide a holistic and proactive approach to monitoring Internet application performance. By deploying observability agents across various geographical locations, the system collects detailed performance metrics, which are accurately mapped to specific applications using URL and IP-based mechanisms.

These metrics are then used to establish baselines that represent normal performance levels, enabling the detection of anomalies and performance degradations. PoP mapping further enhances the system by correlating agent data with application points of presence, providing geographical insights into performance. This interconnected approach ensures that enterprises can maintain optimal application performance, quickly identify and resolve issues, and deliver a consistent high quality user experience across all regions.

Further, this system is able rapidly detect malfunctioning in application before a total failure is experienced. Furthermore, the system may not require direct cooperation from the application whose health is being monitored (e.g., no instrumentation needed). Instead, the system may operate based on active and/or real-time measurements extracted across distributed vantage point agents.

While there have been shown and described illustrative implementations that provide for application health monitoring utilizing distributed vantage points, it is to be understood that various other adaptations and modifications may be made within the intent and scope of the implementations herein. In addition, while certain processes are shown, other suitable processes may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method, comprising:

obtaining, by a device, performance metrics from vantage points distributed across a computing network;

mapping, by the device, the performance metrics to a corresponding application based on a network address associated with the performance metrics;

generating, by the device, a mapping of each of the vantage points to corresponding points of presence of the corresponding application, wherein the mapping identifies a closest point of presence of the corresponding application for each of the vantage points;

establishing, by the device, a performance metric baseline for the corresponding application based on the performance metrics that are mapped to the corresponding application;

identifying, by the device, an anomaly in a particular performance metric of the performance metrics that are mapped to the corresponding application based on a comparison to the performance metric baseline; and generating, by the device and based on the mapping, a characterization of performance metrics that indicates how one or more of the points of presence of the corresponding application are serving different geographical regions.

2. The method as in claim 1, wherein the particular performance metric is mapped to the corresponding application using one or more of a landing uniform resource locator or a destination Internet protocol address extracted from the network address associated with the performance metrics.

3. The method as in claim 1, wherein mapping of the performance metrics to the corresponding application includes:

identifying a matching application for a root domain extracted from the network address associated with the performance metrics; and identifying a matching sub-application for a subdomain extracted from the network address associated with the performance metrics.

4. The method as in claim 1, wherein the performance metrics include HTTP response timing measurements.

5. The method as in claim 4, wherein the performance metrics include one or more of redirect, domain name system, connect, secure socket layer, send, receive, or time-to-first-byte metrics based on the HTTP response timing measurements.

6. The method as in claim 1, wherein the performance metrics include HTTP response codes returned to the vantage points from attempted HTTP connections.

7. The method as in claim 1, wherein the performance metrics include page load and document object model load metrics.

8. The method as in claim 1, further comprising:

performing a root cause analysis of the anomaly by correlating the particular performance metric with additional network data including ping, traceroute, and border gateway protocol data.

9. An apparatus, comprising:

one or more network interfaces;

a processor coupled to the one or more network interfaces and configured to execute one or more processes; and a memory configured to store a process that is executable by the processor, the process when executed configured to:

obtain performance metrics from vantage points distributed across a computing network;

map the performance metrics to a corresponding application based on a network address associated with the performance metrics;

generate a mapping of each of the vantage points to corresponding points of presence of the corresponding application, wherein the mapping identifies a closest point of presence of the corresponding application for each of the vantage points;

establish a performance metric baseline for the corresponding application based on the performance metrics that are mapped to the corresponding application;

identify an anomaly in a particular performance metric of the performance metrics that are mapped to the corresponding application based on a comparison to the performance metric baseline; and generate, based on the mapping, a characterization of performance metrics that indicates how one or more of the points of presence of the corresponding application are serving different geographical regions.

10. The apparatus as in claim 9, wherein the particular performance metric is mapped to the corresponding application using one or more of a landing uniform resource locator or a destination Internet protocol address extracted from the network address associated with the performance metrics.

11. The apparatus as in claim 9, wherein the process is further configured to:

identify a matching application for a root domain extracted from the network address associated with the performance metrics; and identify a matching sub-application for a subdomain extracted from the network address associated with the performance metrics.

12. The apparatus as in claim 9, wherein the performance metrics include HTTP response timing measurements.

13. The apparatus as in claim 12, wherein the performance metrics include one or more of redirect, domain name system, connect, secure socket layer, send, receive, or time-to-first-byte metrics based on the HTTP response timing measurements.

14. The apparatus as in claim 9, wherein the performance metrics include HTTP response codes returned to the vantage points from attempted HTTP connections.

15. The apparatus as in claim 9, wherein the performance metrics include page load and document object model load metrics.

16. A tangible, non-transitory, computer-readable medium storing program instructions that cause a device to execute a process comprising:

obtaining performance metrics from vantage points distributed across a computing network;

mapping the performance metrics to a corresponding application based on a network address associated with the performance metrics;

generating a mapping of each of the vantage points to corresponding points of presence of the corresponding application, wherein the mapping identifies a closest point of presence of the corresponding application for each of the vantage points;

establishing a performance metric baseline for the corresponding application based on the performance metrics that are mapped to the corresponding application;

identifying an anomaly in a particular performance metric of the performance metrics that are mapped to the corresponding application based on a comparison to the performance metric baseline; and generating, based on the mapping, a characterization of performance metrics that indicates how one or more of the points of presence of the corresponding application are serving different geographical regions.

17. The method as in claim 1, wherein the mapping provides an overview of a geolocation distribution of infrastructure of the corresponding application.

18. The method as in claim 1, wherein the characterization indicates performance of the corresponding application for one or more source and destination pairs.

19. The apparatus as in claim 9, wherein the mapping provides an overview of a geolocation distribution of infrastructure of the corresponding application.

20. The apparatus as in claim 9, wherein the characterization indicates performance of the corresponding application for one or more source and destination pairs.

* * * * *